Feb. 20, 1945.    R. J. OLANDER    2,369,793
FRICTION SHOCK ABSORBING MECHANISM
Filed Feb. 12, 1944
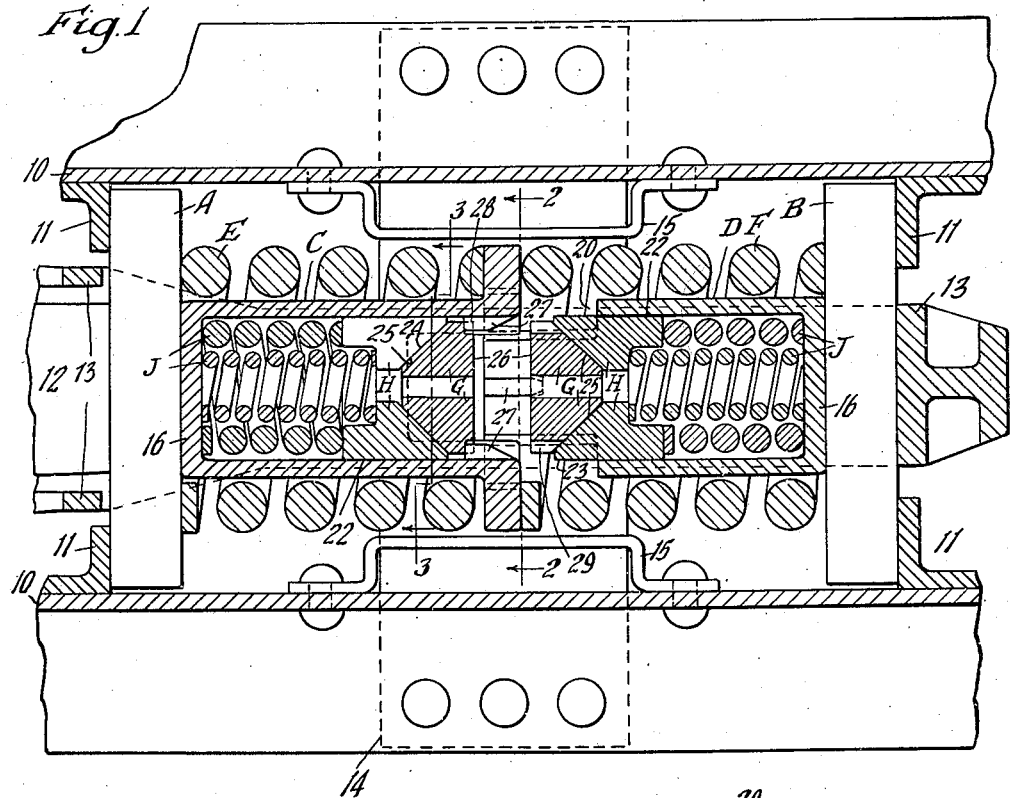
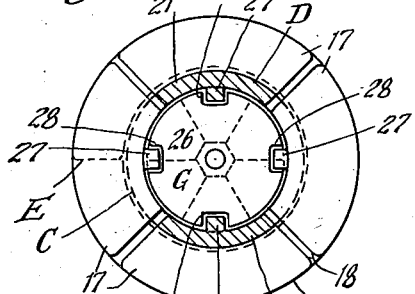
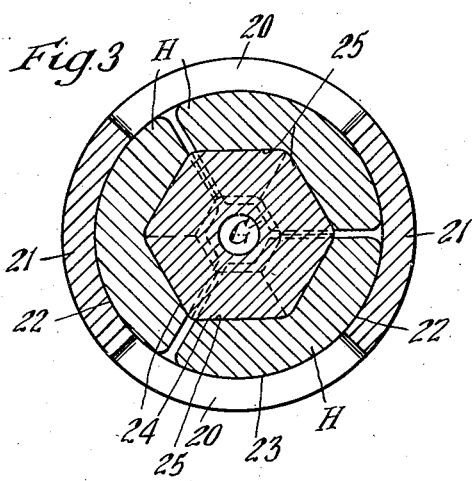
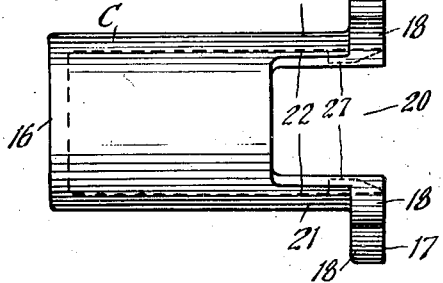
Inventor
Roland J. Olander
By Henry Fuchs
Atty.

Patented Feb. 20, 1945

2,369,793

UNITED STATES PATENT OFFICE 2,369,793

FRICTION SHOCK ABSORBING MECHANISM

Roland J. Olander, Chicago, Ill., assignor to W. H. Miner, Inc., Chicago, Ill., a corporation of Delaware Application February 12, 1944, Serial No. 522,069

5 Claims. (Cl. 213—24)

This invention relates to improvements in friction shock absorbing mechanisms.

One object of the invention is to provide an efficient shock absorbing mechanism, especially adapted for railway draft riggings having combined spring and frictional cushioning action, wherein the frictional resistance becomes effective to augment the spring resistance to take care of the heavier shocks after a predetermined compression of the spring resistance.

Another object of the invention is to provide a mechanism as set forth in the preceding paragraph, wherein high spring capacity is obtained by springs compressed in tandem.

Other objects of the invention will more clearly appear from the description and claims hereinafter following.

In the drawing forming a part of this specification, Figure 1 is a horizontal longitudinal sectional view of a portion of a railway draft rigging, showing my improvements in connection therewith. Figures 2 and 3 are transverse vertical sectional views, corresponding respectively to the lines 2—2 and 3—3 of Figure 1, Figure 3 being on an enlarged scale. Figure 4 is a top plan view of the front friction casing of my improved mechanism, as shown in Figure 1.

In said drawing, 10—10 indicate channel-shaped center sills of a railway car underframe to the inner faces of which are secured front and rear stop lugs 11—11 and 11—11. The inner end portion of the drawbar is indicated by 12, to which is operatively secured a hooded yoke 13 of well-known form. The yoke and parts therewithin are supported in operative position by a detachable saddle plate 14 and the shock absorbing mechanism is held properly centered between the sills by guide brackets 15—15 secured to the inner sides of the sills.

My improved friction shock absorbing mechanism comprises broadly front and rear followers A and B; front and rear friction casings C and D; front and rear outer springs E and F; a friction clutch within each casing, comprising a wedge G and three friction shoes H—H—H; and a spring J within each casing, yieldingly opposing inward movement of the clutch.

The front and rear follower blocks A and B are of identical design and correspond to the usual main followers employed in a draft rigging. Each follower block is in the form of a heavy, rectangular plate. The followers A and B are disposed within the yoke 13 at the front and rear ends thereof and cooperate in the usual manner with the front and rear stop lugs 11—11 and 11—11.

The front and rear friction casings C and D are identical, each casing being in the form of a tubular, cylindrical shell closed at the outer end by a transverse wall 16. As shown in Figure 1, the friction casings C and D are reversely arranged end for end, having the closed or outer ends thereof bearing respectively on the front and rear followers A and B. At the inner end, each casing is provided with two diametrically opposed, laterally outwardly projecting, plate-like flanges 17—17 having diverging side edges 18—18 radial to the longitudinal central axis of the shell, and a curved outer edge 19 concentric to said axis. The opposed flanges 17—17 of each casing provide intermediate follower members integral with said casing. Between the flanges 17—17, the opposed side wall portions of the casing are cut out, or recessed, providing longitudinally extending, diametrically opposite slots 20—20, and diametrically opposite arms 21—21 extending lengthwise of the casing. The slots of each casing are of a width to accommodate the arms 21—21 of the other casing for lengthwise sliding movement therein. As will be evident, the flanges 17—17 of each casing are at the outer ends of the arms thereof and form intermediate follower members. The casings C and D are reversely arranged end for end and have the arms 21—21 thereof intermeshed, the casing C being turned about its axis through an angle of 90 degrees with respect to the casing D.

The interior of each casing is of substantially circular, transverse cross section and presents a longitudinally extending, interior friction surface 22 of cylindrical form. Each casing has slidingly telescoped therewith the friction clutch comprising the three shoes H—H—H and a central wedge block G.

Each shoe H has a cylindrical friction surface 23 on the outer side slidably engaged with the interior friction surface 22 of the casing. On the inner side, each shoe has a wedge face 24 of V-shaped transverse cross section adapted to cooperate with the wedge G.

The wedge G is disposed centrally between the three shoes H—H—H and has three wedge faces 25—25—25 of V-shaped, transverse section, respectively engaged with the wedge faces 24—24—24 of the three shoes. The wedge G has a substantially flat, transverse, outer, end face 26 forming an abutment face. Inwardly projecting lugs 27—27 are provided on the inner sides of the arms 21—21 of each casing for limiting outward movement of the wedge, the lugs 27—27 shouldering in seats 28—28 at diametrically opposed sides of the wedge. At diametrically opposite sides, removed 90 degrees from the seats 27—27, the wedge is cut out or provided with longitudinal slots 29—29, which clear the lugs 27—27 in assembling the wedge with the casing. These slots 29—29 further provide clearance for the lugs when the outer end of the wedge of one casing is moved into the open end of the other casing.

Each casing contains one of the springs J. The spring J preferably comprises a light inner coil and a heavier outer coil, bearing at opposite ends on the inner ends of the shoes and the closed end of the casing.

As shown most clearly in Figure 1, which illustrates the normal release position of the mechanism, the wedge blocks G—G of the front and rear casings are held spaced apart lengthwise of the mechanism by means of the stop lugs 27—27 of the casings C and D, and the slots 29—29 of the wedge blocks G of each casing are aligned with the lugs 27—27 of the other casing so that movement of the wedge inwardly of said last named casing will not be interfered with by said lugs.

The outer springs E and F are disposed at the front and rear ends of the mechanism, respectively, the spring E surrounding the front casing C, with its front end bearing on the front follower A and its rear end bearing on the follower members 17—17 of the rear casing B, and the spring F surrounding the rear casing C, with its rear end bearing on the rear follower B and its front end bearing on the follower members 17—17 of the front casing C.

The operation of my improved shock absorbing mechanism is as follows: Upon a draft or pulling action being applied to the drawbar, the rear main follower B is pulled forwardly by the yoke 13, carrying the rear friction casing D therewith, compressing the rear spring F between the follower B and the follower members 17—17 of the front casing C, which is held stationary during this action by abutment with the front follower A, which is held against outward movement by the front stop lugs 11—11, and compressing the front spring E between the follower members 17—17 of the rear casing D and the stationary front main follower A. This action of the mechanism continues until the wedge block G of the rear casing D comes into engagement with the wedge block G of the front casing, whereupon the friction clutches of the two casings will be forced inwardly of said casings with resultant high capacity frictional resistance to absorb the heavier shocks to which the mechanism may be subjected in service.

During buffing action, the operation is the same as hereinbefore described with the exception that the front casing C is moved rearwardly with the front follower and the rear casing D is held stationary.

Compression of the mechanism is limited by engagement of the ends of the arms 21—21 of the casings with the stops formed by the inner end walls of the slots 20—20 of the casings, thereby preventing undue compression of the springs of the mechanism.

In release, the expansive action of the springs E, F, and J restores all of the parts of the mechanism to the normal position shown in Figure 1.

I have herein shown and described what I now consider the preferred manner of carrying out my invention, but the same is merely illustrative and I contemplate all changes and modifications that come within the scope of the claims appended hereto.

I claim:

1. In a shock absorbing mechanism, the combination with front and rear main followers movable relatively toward and away from each other lengthwise of the mechanism; of front and rear pressure transmitting friction casings bearing respectively on said front and rear main followers; intermediate follower means on said casings, respectively; front and rear spring members surrounding said front and rear casings, respectively, said front spring member bearing at its front and rear ends on the front main follower and the intermediate follower of said rear casing, and said rear spring member bearing at its front and rear ends on said intermediate follower of the front casing and said rear main follower; a friction clutch within each casing; and spring means within each casing yieldingly resisting inward movement of the clutch, said clutch means of said casings being actuated after a predetermined compression of the mechanism.

2. In a shock absorbing mechanism, the combination with front and rear main followers movable relatively toward and away from each other lengthwise of the mechanism; of front and rear pressure transmitting friction casings bearing respectively on said front and rear main followers; intermediate follower means on said casings, respectively; front and rear spring members surrounding said front and rear casings, respectively, said front spring member bearing at its front and rear ends on the front main follower and the intermediate follower of said rear casing, and said rear spring member bearing at its front and rear ends on said intermediate follower of the front casing and said rear main follower; a friction clutch within each casing at the inner end thereof, each clutch including an outer wedge block and friction shoes interposed between said wedge block and the interior walls of the casing, said wedge blocks being engageable with each other during compression of the mechanism to actuate the friction clutches of said casings; means for holding said wedge blocks spaced apart during a predetermined initial compression of the mechanism; and spring means within said casings opposing inward movement of the shoes.

3. In a shock absorbing mechanism, the combination with front and rear main followers movable relatively toward and away from each other lengthwise of the mechanism; of front and rear pressure transmitting friction casings open at their inner ends, said front casing bearing at its outer end on said front main follower and said rear casing bearing at its outer end on said rear main follower; friction shoes telescoped within the open inner end of each casing; an outer wedge block in wedging engagement with the shoes of each casing; stop means on said casings normally holding said wedge blocks spaced apart a sufficient distance to permit a predetermined compression of the mechanism before said blocks come into engagement with each other; springs within said casings yieldingly opposing inward movement of said shoes; front intermediate follower members at the rear end of the front casing and rigid therewith; rear intermediate follower members at the front end of the rear casing and rigid therewith; and front and rear outer springs surrounding said casings, said front spring bearing at opposite ends on said front main follower and the rear intermediate follower members, and said rear spring bearing at opposite ends on said front intermediate follower members and said rear main follower.

4. In a shock absorbing mechanism, the combination with front and rear main followers movable relatively toward and away from each other lengthwise of the mechanism; of front and rear pressure transmitting friction casings open at their inner ends, said front casing bearing at its outer end on said front main follower and said rear casing bearing at its outer end on said rear main follower; friction shoes telescoped within the open inner end of each casing; an outer wedge block in wedging engagement with the shoes of each casing; stop means on said casings normally holding said wedge blocks spaced apart a sufficient distance to permit a predetermined compression of the mechanism before said blocks come into engagement with each other; springs within said casings yieldingly opposing inward movement of said shoes; a pair of rearwardly extending arms on said front casing; a pair of forwardly extending arms on said rear casing engaged between the arms of the front casing; front intermediate follower members at the rear ends of the arms of the front casing and rigid therewith; rear intermediate follower members at the front ends of the arms of the rear casing and rigid therewith; and front and rear outer springs surrounding said casings, said front spring bearing at opposite ends on said front main follower and the rear intermediate follower members, and said rear spring bearing at opposite ends on said front intermediate follower members and said rear main follower.

5. In a shock absorbing mechanism, the combination with front and rear main followers movable relatively toward and away from each other lengthwise of the mechanism; of front and rear pressure transmitting friction casings open at their inner ends, said front casing bearing at its outer end on said front main follower and said rear casing bearing at its outer end on said rear main follower; friction shoes telescoped within the open inner end of each casing; an outer wedge block in wedging engagement with the shoes of each casing; stop means on said casings normally holding said wedge blocks spaced apart a sufficient distance to permit a predetermined compression of the mechanism before said blocks come into engagement with each other; springs within said casings yieldingly opposing inward movement of said shoes; a pair of rearwardly extending, diametrically opposite arms on said front casing; a pair of forwardly extending, diametrically opposite arms on said rear casing slidably engaged between the arms of said front casing; front intermediate follower members at the rear ends of the arms of the front casing and rigid therewith; rear intermediate follower members at the front ends of the arms of the rear casing and rigid therewith, each of said intermediate follower members comprising a platelike section laterally outwardly projecting from the corresponding arm; and front and rear outer springs surrounding said casings, said front spring bearing at opposite ends on said front main follower and the rear intermediate follower members, and said rear spring bearing at opposite ends on said front intermediate follower members and said rear main follower.

ROLAND J. OLANDER.